(12) United States Patent
Lu et al.

(10) Patent No.: US 11,388,406 B2
(45) Date of Patent: Jul. 12, 2022

(54) PIECE-WISE-LINEAR MAPPING FOR IN-LOOP RESHAPING IN IMAGE CODING

(71) Applicant: Dolby Laboratories Licensing Corporation, San Francisco, CA (US)

(72) Inventors: Taoran Lu, Santa Clara, CA (US); Peng Yin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/876,937

(22) Filed: May 18, 2020

(65) Prior Publication Data
US 2021/0029361 A1 Jan. 28, 2021

Related U.S. Application Data

(60) Provisional application No. 62/860,391, filed on Jun. 12, 2019, provisional application No. 62/850,414, filed on May 20, 2019.

(51) Int. Cl.
| | |
|---|---|
| *H04N 19/132* | (2014.01) |
| *H04N 19/182* | (2014.01) |
| *H04N 19/70* | (2014.01) |
| *H04N 19/136* | (2014.01) |
| *H04N 19/186* | (2014.01) |

(52) U.S. Cl.
CPC ......... *H04N 19/132* (2014.11); *H04N 19/136* (2014.11); *H04N 19/182* (2014.11); *H04N 19/186* (2014.11); *H04N 19/70* (2014.11)

(58) Field of Classification Search
CPC ....... H04N 19/186; H04N 19/96; H04N 19/13
See application file for complete search history.

(56) References Cited

U.S. PATENT DOCUMENTS

| | | | |
|---|---|---|---|
| 2017/0085880 A1* | 3/2017 | Minoo | G06T 5/007 |
| 2017/0085889 A1* | 3/2017 | Baylon | H04N 19/44 |
| 2018/0278967 A1* | 9/2018 | Kerofsky | H04N 19/186 |
| 2021/0321121 A1* | 10/2021 | Zhang | H04N 19/186 |
| 2021/0321140 A1* | 10/2021 | Zhang | H04N 19/117 |

FOREIGN PATENT DOCUMENTS

| | | |
|---|---|---|
| EP | 3709656 A1 * | 9/2020 |
| WO | WO-2020086421 A1 * | 4/2020 |

OTHER PUBLICATIONS

"High Dynamic Range Video Coding with Backward Compatibility"—Dmytro Rusanovskyy, Done Bugdayci Sansli, Adarsh Ramasubramanian, Sungwon Lee, Joel Sole, Marta Karczewicz; 2016 Data Compression Conference. (Year: 2016).*

(Continued)

*Primary Examiner* — Mainul Hasan

(57) ABSTRACT

Given a representation of a forward reshaping function in an M-piecewise linear representation (M-PWL), methods, processes, and systems are presented for generating the forward reshaping function in an N-PWL representation (where N<M), by properly adjusting the first and last segments, and for generating a decoded bitstream using the adjusted N-PWL reshaping representation. Syntax methods for signaling reshaping parameters are also presented.

16 Claims, 7 Drawing Sheets

(56) References Cited

OTHER PUBLICATIONS

"Algorithm description for Versatile Video Coding and Test Model 4 (VTM 4)," J. Chen et al., JVET Output document, JVET-M1002-v2, 13th Meeting, Marrakech, Jan. 9-18, 2019.
B. Bross, J. Chen, and S. Liu, "Versatile Video Coding (Draft 5)," JVET output document, JVET-N1001, v5, uploaded, May 14, 2019.
ITU-R BT. 2100 "Image Parameter Values for High Dynamic Range Television for Use in Production and International Programme Exchange" ITU, Jul. 2016.
SMPTE 2084:2014 "High Dynamic Range Electro-Optical Transfer Function of Mastering Reference Displays" Aug. 16, 2014.

* cited by examiner

PIECE-WISE-LINEAR MAPPING FOR IN-LOOP RESHAPING IN IMAGE CODING

CROSS-REFERENCE TO RELATED APPLICATIONS

This application claims priority to U.S. Provisional Application Nos. 62/850,414 filed May 20, 2019 and 62/860,391, filed Jun. 12, 2019, each of which is incorporated by reference in its entirety.

TECHNOLOGY

The present document relates generally to images and video coding. More particularly, an embodiment of the present invention relates to image reshaping in video coding.

BACKGROUND

In 2013, the MPEG group in the International Standardization Organization (ISO), jointly with the International Telecommunications Union (ITU), released the first draft of the HEVC (also known as H.265) video coding standard. More recently, the same group has been working on the development of the next generation coding standard (referred to as Versatile Video Coding or VVC standard (Ref. [1])) that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution. As appreciated by the inventors here, as development continues for the next generation of a video coding standard, improved techniques for the integrated reshaping and coding of images are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
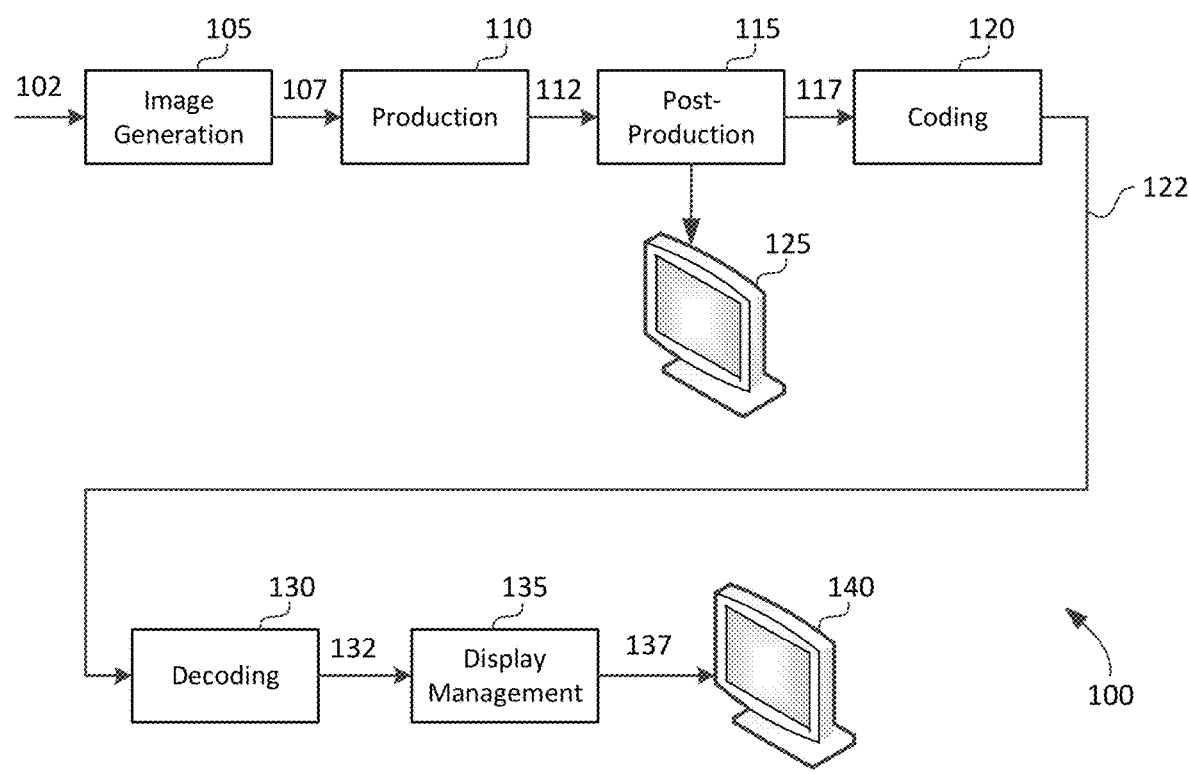
FIG. 1 depicts an example process for a video delivery pipeline according to prior art.

Techniques for piece-wise linear (PWL) representation methods for reshaping functions in signal reshaping in video coding are described herein. In the following description, for the purposes of explanation, numerous specific details are set forth in order to provide a thorough understanding of the various embodiments of the present invention. It will be apparent, however, that the various embodiments of the present invention may be practiced without these specific details. In other instances, well-known structures and devices are not described in exhaustive detail.

Overview

Example embodiments described herein relate to signal reshaping and coding for video. In an encoder, a processor generates a first piece-wise linear representation of a forward reshaping function using N equal segments, wherein the forward reshaping function maps luma pixel values of an input video sequence from a first codeword representation to a second codeword representation, wherein the codeword start of the first segment is zero and the codeword end of the last segment is $2^{Bitdepth}-1$, where Bitdepth denotes the bit-depth of the luma pixels of the video sequence. The processor adjusts the codeword start of the first segment and the codeword end of the last segment in the first piece-wise linear representation to generate an output piece-wise linear representation of the forward reshaping function using N unequal segments. The processor generates syntax elements related to the output piece-wise linear representation of the forward reshaping function, and it generates a coded bitstream using the output piece-wise linear representation of the forward reshaping function, wherein the coded bitstream includes the syntax elements related to the output piece-wise linear representation of the forward reshaping function.

In a decoder, a processor receives syntax elements for a piece-wise linear representation of a forward reshaping function using N segments, wherein the forward reshaping function maps luma pixel values of the coded bitstream from a first codeword representation to a second codeword representation, wherein the syntax elements comprise one or more pivot parameters to adjust the codeword start of the first segment from 0 to a second codeword start and to adjust the codeword end of the last segment from $2^{Bitdepth}-1$, to a second codeword end, where Bitdepth denotes the bit-depth of the luma pixels of the coded bitstream. The processor determines the second codeword start of the first segment and the second codeword end of the last segment based on the one or more pivot parameters to generate an adjusted piece-wise linear representation of the forward reshaping function, and the processor decodes the coded bitstream based on the adjusted piece-wise linear representation of the forward reshaping function.

In another embodiment, a video decoder receives a coded bitstream and parameters to determine a forward reshaping function. During decoding, for a pixel region in the coded bitstream encoded in intra mode and using a dual tree representation, the processor:
  decodes luma pixels of the pixel region based on the forward reshaping function;
  determines an average of luma pixels in a sub-region of the pixel region, wherein the sub-region comprises one or more pixels in the top upper left area of the pixel region;
  determines a chroma scaling value based on the average of luma pixels in the sub-region; and
  determines chroma pixels of the pixel region based on the chroma scaling value.

In another embodiment, a video decoder receives a coded bitstream and parameters to determine a forward reshaping function. During decoding, for a pixel region in the coded bitstream encoded in intra mode and using a dual tree representation, the processor:
  determines an average of luma pixels in one or more sub-regions neighboring the top side, the left side, or the top-left corner of the pixel region;
  determines a chroma scaling value based on the average of luma pixels in the one or more sub-regions; and
  determines the chroma pixels of the pixel region based on the chroma scaling value.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

As used herein, the term "reshaper" may denote a forward or an inverse reshaping (or mapping) function to be used when coding and/or decoding digital images.

Figure 2A:
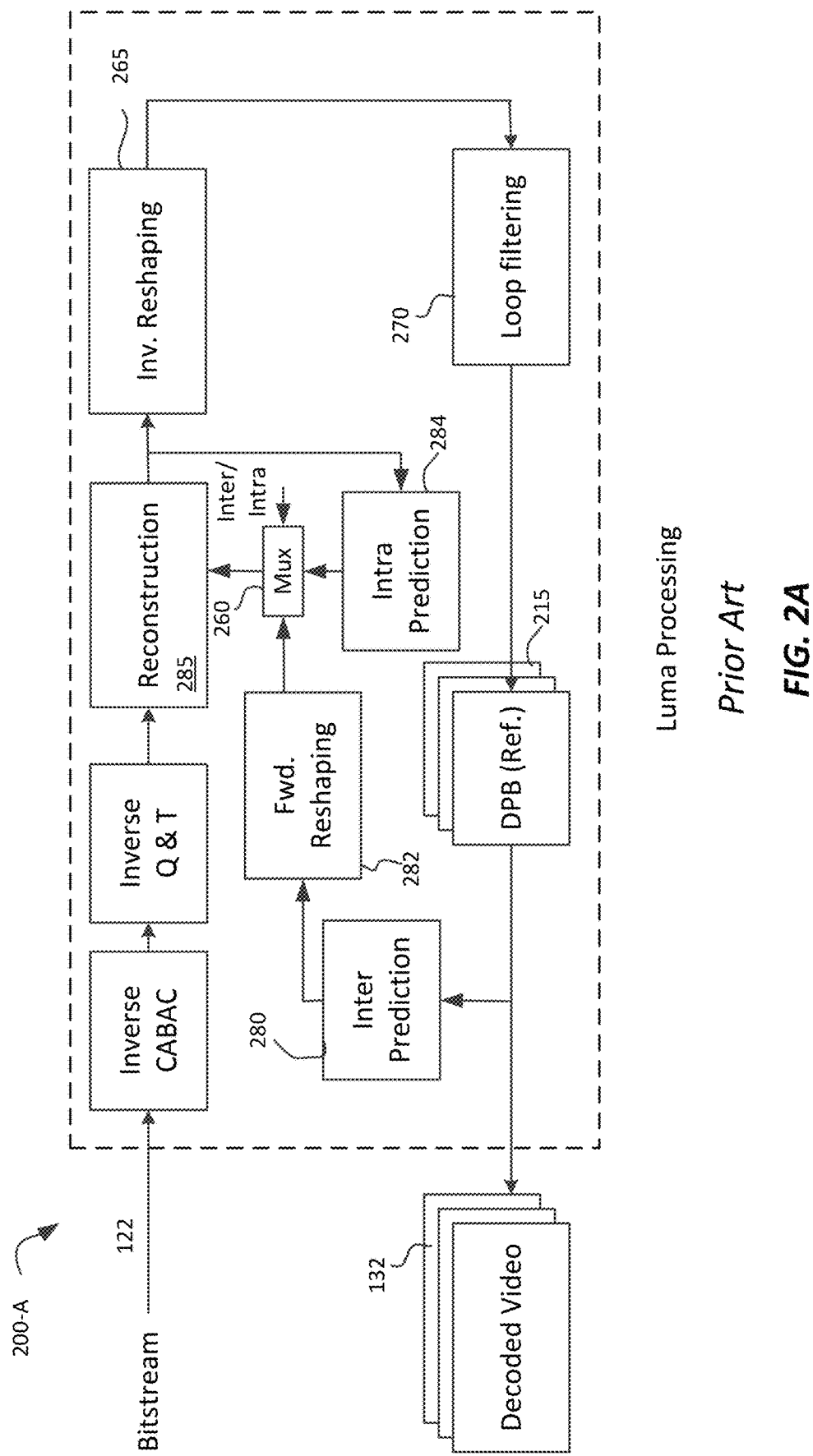
FIG. 2A depicts an example architecture for in-loop decoding of luma data according to prior art.
Figure 2B:
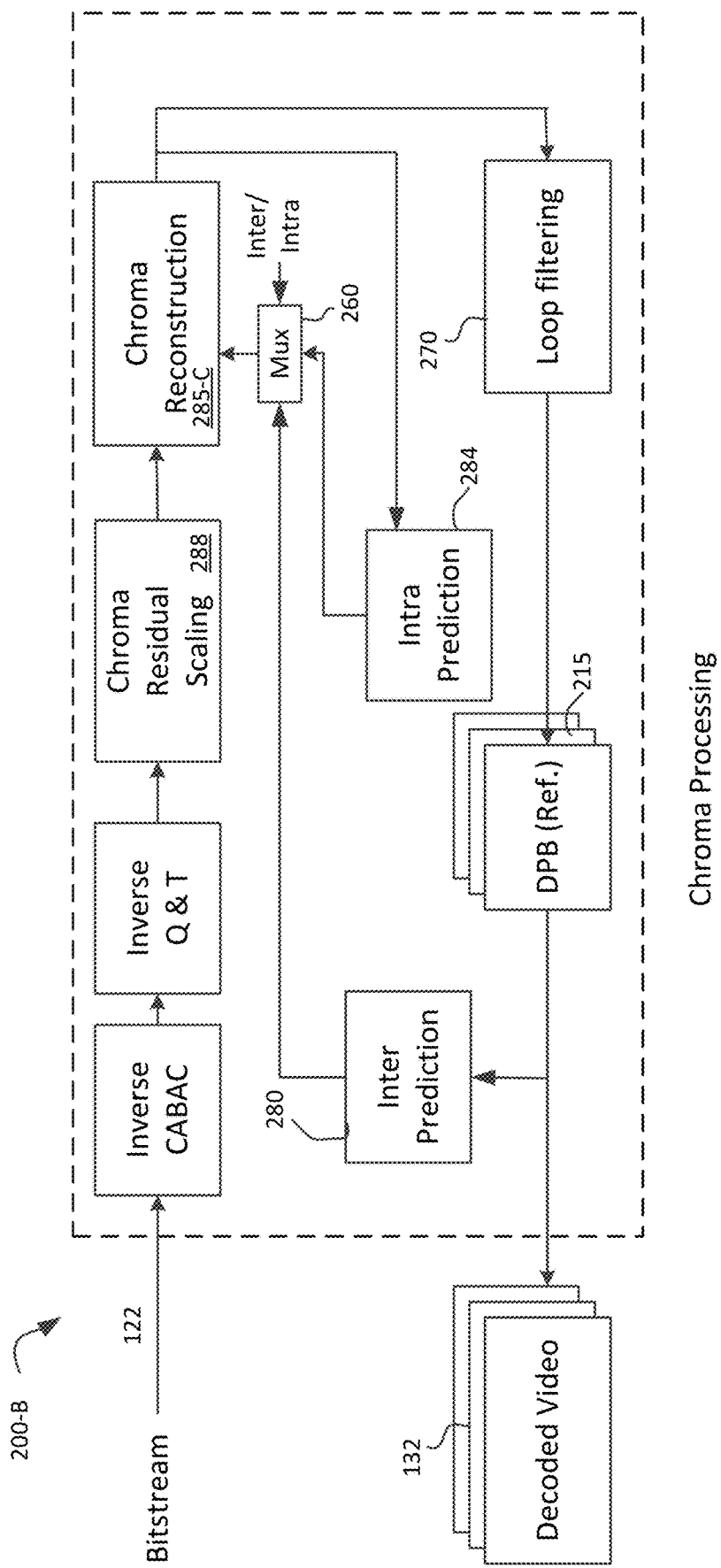
FIG. 2B depicts an example architecture for in-loop decoding of chroma data according to prior art.

FIG. 2A and FIG. 2B depict example decoding processes for in-loop signal reshaping according to Refs. [1-3]. In VVC, reshaping is referred to as LMCS—Luma Mapping with Chroma residue Scaling. Process 200-A is related to luma processing and process 200-B is related to chroma processing.

For luma, given a coded bitstream (122), after inverse arithmetic coding (e.g. inverse CABAC) and inverse quantization and transform (Inverse Q&T), in the reconstruction module (285), given the output Res of Inverse Q&T, for Inter-coded units (CUs) (e.g., the Mux (260) enables the output from 280 and 282), its output $Y_r$ or RecSample is computed as:

$$Y_r = \text{RecSample} = (\text{Res} + \text{FwdMap}(\text{PredSample})), \quad (1)$$

where FwdMap(PredSample) denotes the output (e.g., PredSample or $Y_{pred}$) of the inter predictor (280) followed by forward reshaping (282) using forward reshaping function FwdMap( ). Otherwise, for Intra CUs (e.g., the Mux (260) enables the output from intra prediction unit 284), the output of the reconstruction module (285) is $$Y_r = \text{RecSample} = (\text{Res} + \text{IPredSample}), \quad (2)$$

where IPredSample denotes the output of the Intra Prediction block (284). Given an inverse reshaping function InvMap( ) the inverse Reshaping block (265), generates $$Y_{ir} = \text{InvMap}(\text{RecSample}). \quad (3)$$

Inverse reshaping (265) is followed by traditional loop filtering (270) in the original domain, and the output of loop filtering is stored in the display-picture-buffer (DPB) (215) to be used as reference pictures for inter prediction (280) or to generate the decoded video (132).

When applying intra prediction for inter slices in the reshaped domain, special care needs to be taken in the combined inter/intra prediction mode (that is, when during reconstruction, some samples are from inter-coded blocks and some are from intra-coded blocks), since inter-prediction is in the original domain, but intra-prediction is in the reshaped domain. When combining data from both interand intra-predicted coded units, the prediction may be performed in either of the two domains. For example, when the combined inter/intra prediction mode is done in the reshaped domain, then $$\text{PredSampleCombined} = \text{PredSampeIntra} + \text{FwdMap} \\ (\text{PredSampleInter}) \quad (4)$$

$$\text{RecSample} = \text{Res} + \text{PredSampleCombined}, \quad (5)$$

that is, inter-coded samples in the original domain are reshaped before the addition. Otherwise, when the combined inter/intra prediction mode is done in the original domain, then:

$$\text{PredSampleCombined} = \text{InvMap}(\text{PredSampeIntra}) + \\ \text{PredSampleInter} \quad (6)$$

$$\text{RecSample} = \text{Res} + \text{FwdMap}(\text{PredSampleCombined}), \quad$$

that is, intra-predicted samples are inversed-reshaped to be in the original domain.

Similar considerations are applicable to the corresponding encoding embodiments as well, since an encoder (not shown) will include a decoder loop that matches the corresponding decoder.

For chroma, when in-loop reshaping is enabled, as depicted in FIG. 2B, the following changes are made:
- The forward and reverse reshaping blocks (282 and 265) blocks are not used
- There is a new chroma residual scaling block (288); and
- The reconstruction block (285-C) is modified to handle color residuals as $$\text{CxRec} = \text{CxPred} + \text{CxRes}, \quad (7)$$

where CxRes denotes the output of chroma residual scaling block (288), CxPred denotes the output of predicted chroma samples, generated either by the Intra (284) or Inter (280) Prediction blocks, and CxRec denotes the output.

Let CxResScaled denote the extracted scaled chroma residual signal after inverse quantization and transform (before block 288), and let $$\text{CxRes} = \text{CxResScaled} * C_{ScaleInv}, \quad (8)$$

denote the rescaled chroma residual generated by the Chroma Residual scaling block (288) to be used by the reconstruction unit (285-C) to compute its output according to equation (7).

The $C_{ScaleInv}$ value being used for a Transform Unit (TU) may be shared by the Cb and Cr components, it is luma dependent, and can be computed as follows:
- If in intra mode, then compute the average of intra predicted luma values;
- if in inter mode, then compute the average of forward reshaped inter-predicted luma values. That is, the average luma value $\text{avgY'}_{TU}$ is computed in the reshaped domain; and
- If in combined merge and intra prediction, then compute the average of combined predicted luma values. For example, the combined predicted luma values may be computed according to Ref [1].
- In an embodiment, one can apply a LUT to compute C ScaleInv based on $\text{avgY'}_{TU}$. Alternatively, given a piece-wise-linear (PWL) representation of the reshaping function one may find the index idx where the value $\text{avgY'}_{TU}$ belongs to in the inverse-mapping PWL. Then, $C_{ScaleInv} = \text{cScaleInv}[\text{idx}]$ An example implementation, as it is applicable to the Versatile Video Coding codec can be found in Ref. [1].

Modeling of a Reshaping Function Using a Piecewise Linear Model

Reshaping (or mapping) of the luma component adjusts the dynamic range of the input signal by redistributing the codewords across the dynamic range to improve compression efficiency. Luma mapping makes use of the forward mapping function FwdMap and the corresponding inverse mapping function InvMap. In an embodiment, the FwdMap function may be signaled using a piecewise linear (PWL) model with N equal pieces (e.g., N=16). The InvMap function may be derived from the FwdMap function.

In an embodiment, the piecewise linear model partitions the input signal's dynamic range into N equal pieces, and for each piece, its linear mapping parameters are expressed using the number of codewords assigned to that piece. Take a 10-bit input as an example and N=16. Each of the 16 pieces will have 64 codewords assigned to it by default. The signaled number of codewords is used for chroma values to calculate the scaling factor and adjust the mapping function accordingly for that piece. At the tile group level, another reshaping-enable flag may be signaled to indicate if the reshaping process, as depicted in in FIGS. 2A and 2B, is enabled.

As described in Refs. [1-3], the i-th piece, i=0 . . . 15, of the FwdMap piecewise linear model may be defined by two input pivot points InputPivot[ ] and two output (mapped) pivot points MappedPivot[ ]. The InputPivot[ ] and MappedPivot[ ] values are computed as follows (assuming 10-bit video):

1) OrgCW=64
2) for i=0:16, InputPivot[i]=i*OrgCW
3) for i=0:16, MappedPivot[i] is calculated as follows:
   MappedPivot [0]=0;
   for (i=0; i<16; i++)
   MappedPivot[i+1]=MappedPivot[i]+SignalledCW[i]

where SignalledCW[i] is the signaled number of codewords for the i-th piece.

The luma mapping process (including both forward and/ or inverse mapping) can be implemented using either look-up-tables (LUT) or using on-the-fly computation. If a LUT is used, then FwdMapLUT and InvMapLUT can be pre-calculated and pre-stored for use at the tile group level, and forward and inverse mapping can be simply implemented as $\text{FwdMap}(Y_{pred}) = \text{FwdMapLUT}[Y_{pred}]$ and $\text{InvMap}(Y_r) = \text{InvMapLUT}[Y_r]$, respectively. Alternatively, on-the-fly computation may be used. Take forward mapping function FwdMap as an example. In order to figure out the piece to which a luma sample belongs, the sample value is right-shifted by 6 bits (which corresponds to 16 equal pieces). Then, the linear model parameters for that piece are retrieved and applied on-the-fly to compute the mapped luma value.

Let i be the piece index, a1, a2 be InputPivot[i] and InputPivot[i+1], respectively, and b1, b2 be MappedPivot[i] and MappedPivot[i+1], respectively. The FwdMap function is evaluated as follows:

$$\text{FwdMap}(Y_{pred}) = ((b2-b1)/(a2-a1)) * (Y_{pred}-a1) + b1 \quad (9)$$

The InvMap function can be computed on-the-fly in a similar manner, except that conditional checks need to be applied instead of a simple right bit-shift when figuring out the piece to which the sample value belongs, because the pieces in the mapped domain are not equal-sized.

Chroma Residuals Scaling

In the existing VVC specification (Ref [1]), the tree-related coding scheme supports the ability for luma blocks and chroma blocks to have separate sub-division tree-like structures. This is a referred to as a "dual tree" implementation. In LMCS, chroma residue scaling is luma dependent. To reduce possible pipeline delays, in LMCS, the scaling of chroma residuals is disabled for Intra slices when dual trees (separate trees) are used for Luma and Chroma. This may cause losing coding efficiency when coding chroma. Two new methods are proposed to enable chroma scaling when LMCS is enabled in dual-tree implementations, without affecting in any significant way the processing pipeline delay.

As discussed in Ref. [3], virtual pipeline data units (VPDUs) are defined as non-overlapping pixel regions in a picture. In hardware decoders, successive VPDUs are processed by multiple pipeline stages at the same time. The VPDU size (say, 64×64 for luma and 32×32 for chroma) is roughly proportional to the buffer size in most pipeline stages, so it is important to keep the VPDU size small. In an embodiment, it is proposed to derive the chroma residue scaling value by a constrained pipeline delay for a given VPDU, without explicitly considering the chroma partition type and/or the transform size.

In a first embodiment, when dual tree is enabled, chroma residual scaling for all the blocks in a given VPDU can be derived based on the average of the luma reconstructed samples in the upper-left N×N block of the VPDU. (e.g., N=8 or 16, and the like). The same chroma residual scaling is used for all chroma blocks within the VPDU. This decouples the dependency of luma and chroma partitions. The worst pipeline latency can be computed based on the availability of the luma pixels in the N×N luma reconstruction block.

Figure 2C:
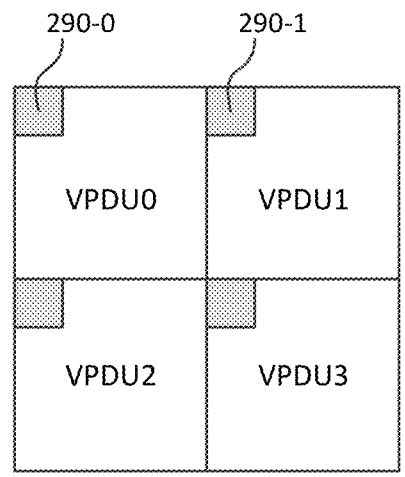
FIG. 2C and FIG. 2D depict examples of luma reference pixel areas to be used when computing chroma scaling of residuals during reshaping according to embodiments.

An example of this approach is depicted in FIG. 2C, where four VPDUs are depicted (VPDU0 to VPDU3). As an example, for VPDU0, chroma scaling may be based on the average of the luma values in the reconstructed top-left N×N block 290-0 (e.g., N=8), and for VPDU1, chroma scaling may be based on the average of the luma values in the top-left N×N block 290-1. As described earlier, given a piece-wise-linear (PWL) representation of the reshaping function, one may find the index idx where the average luma value $avgY'_{CS-LREFn}$ belongs to in the inverse-mapping PWL, and then compute the chroma scaling factor (e.g., $C_{ScaleInv}$=cScaleInv[idx]).

Figure 2D:
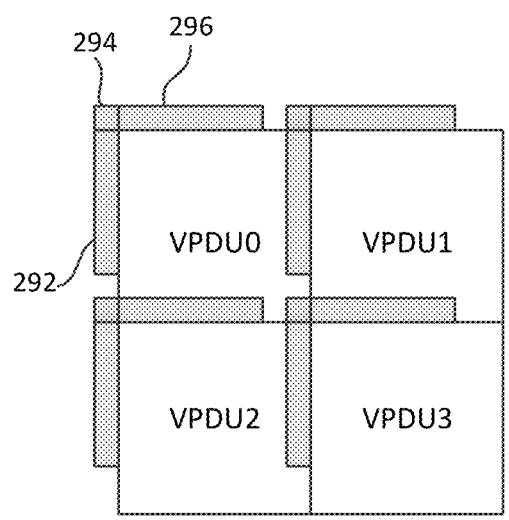

As depicted in FIG. 2D, in another embodiment, when dual tree is enabled, chroma residual scaling for all the blocks in a given VPDU can be derived based on the average of luma reconstructed values available to neighboring samples in the top neighbor VPDU (296), and/or in the left neighbor VPDU (292), and/or in the top-left corner neighbor VPDU (294). To compute the average, on each side, one may use up to 64 pixels (thus, up to 129 pixels total including the corner pixel (294)). Since only reconstructed luma neighboring samples are used, and all of these pixel values are already available when processing in each VPDU starts, there is no pipeline latency in this method; however, there is less accuracy, since chroma scaling is based on luma pixel values of one or more neighboring blocks than luma pixel values of the current block.

In both scenarios (e.g., FIG. 2C and FIG. 2D), to reduce computational complexity, the average of luma pixels can be computed using fewer pixels that the total pixels available (e.g., using sub-sampling). In an embodiment, the total number of pixels can be set to be a power of two (e.g., 2, 4, 8, 16, and the like) so their average luma value can be computed with a simple right shift instead of using a division operation.

Reshaping and Considerations for the Number of Bins

In typical 10-bit video coding, it is preferable to use at least 32 bins for the reshaping mapping; however, to simplify the decoder implementation, in an embodiment, one may use fewer bins, say 16, or even 8 bins. Given that an encoder may already be using 32 bins to analyze the sequence and derive the distribution of codewords, one can reuse the original 32-bin codeword distribution and derive the 16 bins-codewords by adding the corresponding two 16-bins inside each 32 bins, i.e., for i=0 to 15

$$lmcsCW_{16PWL}[i]=lmcsCW_{32PWL}[2i]+lmcsCW_{32PWL}[2i+1], \quad (10)$$

where $lmcsCW_{NPWL}[i]$, e.g., for N=16 or 32, denotes the number of codewords in the i-th bin when using N total bins.

For the chroma residue scaling factor, one can simply divide the number of codewords by 2 and point to the 32-bins chroma ScalingFactor LUT. For example, given $lmcsCW_{32PWL}[32]=\{0\ 0\ 33\ 38\ 38\ 38\ 38\ 38\ 38\ 38\ 38\ 38\ 38\ 38\ 38\ 38\ 33\ 33\ 33\ 33\ 33\ 33\ 33\ 33\ 33\ 33\ 33\ 33\ 33\ 33\ 0\ 0\}$, the corresponding codeword allocation using 16 bins is given by $lmcsCW_{16PWL}[16]=\{0\ 71\ 76\ 76\ 76\ 76\ 76\ 76\ 71\ 66\ 66\ 66\ 66\ 66\ 66\ 0\}$.

This approach can be extended to handle even fewer bins, say 8, then, for i=0 to 7

$$lmcsCW_{8PWL}[i]=lmcsCW_{16PWL}[2i]+lmcsCW_{16PWL}[2i+1]. \quad (11)$$

Restricting the number of bins is beneficial to a decoder, since now it has to do fewer comparisons to identify which bin has to be used; however, it may affect the overall compression efficiency, since the luminance mapping is sub-optimal. For 10-bit coding, the loss in compression efficient when switching from 64 bins to 32 or 16 bins is relatively small; however, reducing the number of bins to 8 or lower may have a significant impact in performance loss, unless the forward reshaping mapping is adjusted. Two such adjustment methods are presented next.

Forward Reshaping PWL Adjustment for Small Number of Segments

Figure 3:
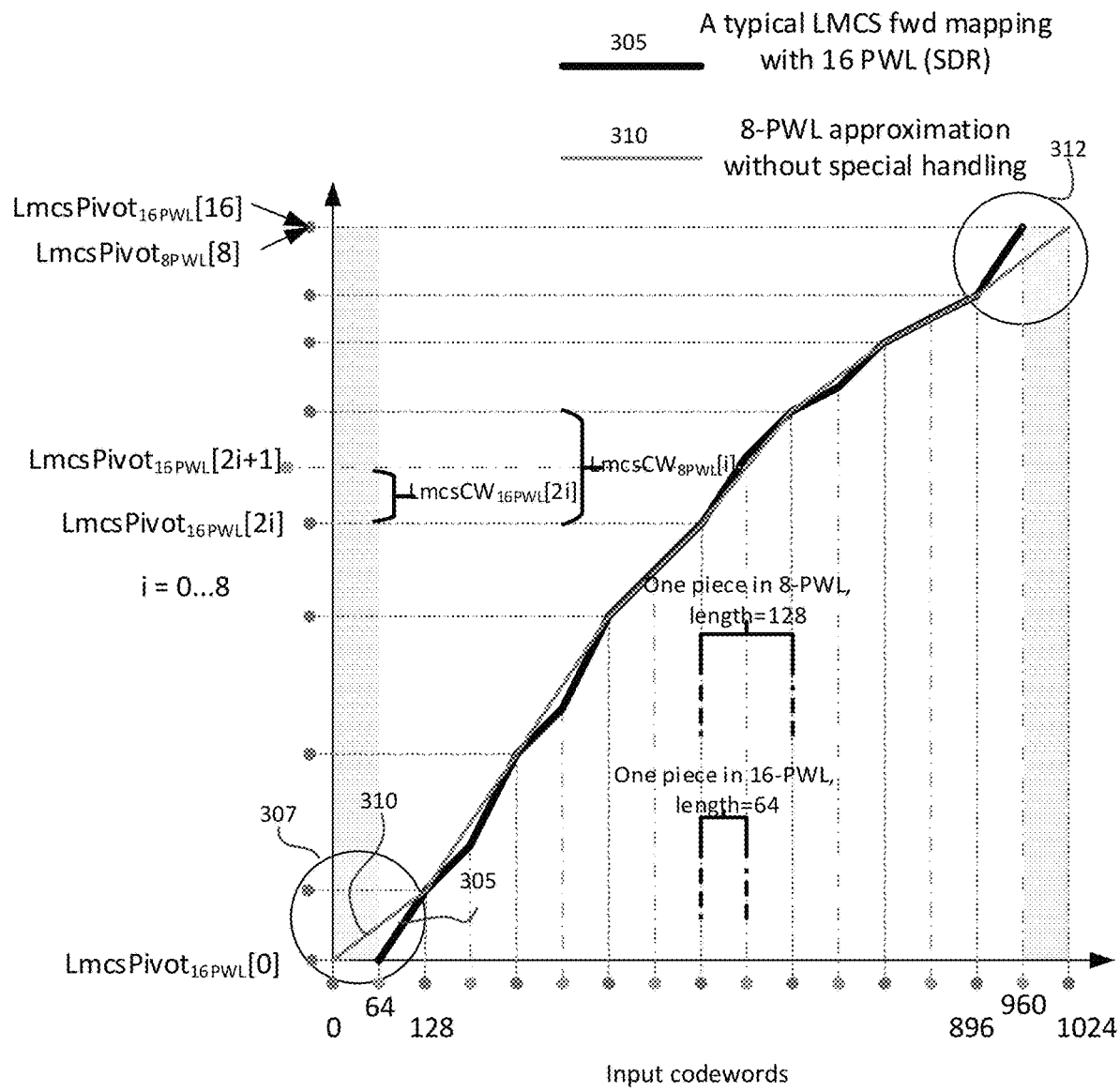
FIG. 3 depicts an example forward reshaping curve with both a 16-piece and an 8-piece piecewise linear representation.

FIG. 3 depicts, without limitation, an example forward reshaping curve for 10-bit, SDR input. The range of possible input codewords is [0, 1024); however, in this example, the true range is [64, 960]. That is, there are no pixels with luminance below 64 or beyond 960. Plot 305 depicts a 16-piece (16-PWL) piece-wise linear representation and plot 310 depicts the corresponding 8-PWL representation using equation (11). $LmcsPivot_{NPWL}[\ ]$, for N=8 or 16, denotes the MappedPivot[ ] values discussed earlier. For example, InputPivot[i] is mapped to $LmcsPivot_{16PWL}[i]$.

As noted in FIG. 3, the two representations are quite close, except at the two end segments: the first one (307) in [0 128), and the last one (312) in [896, 1024). One can see that the slope of the 8-PWL in both of these segments is quite different from the slope of the 16-PWL, which may result in significant coding loss. Two methods are proposed to adjust the 8-PWL representation, and their design trade-offs are discussed.

Method 1—Signal Arbitrary Start and End Pivot Points

Without any adjustments, the values of the start and ending pivot points in an N-PWL representation may be denoted as InputPivot[0]=0 and InputPivot[N]=$2^B$, where B denotes the input bit-depth. In an embodiment, if there are no input codewords for the beginning of the first segment and/or the end-portion of the last segment, the encoder will signal the true starting and ending pivot points of the N-segment representation, so that the slope in these two segments is adjusted to match the slope of an M-PWL representation (M>N). For example, for the mapping depicted in FIG. 3, InputPivot[0]=64 and InputPivot[8]=960. However, all remaining segments are considered to be of equal length and with starting points as if InputPivot[0]=0. For example, for N=8, the pivots would be InputPivot[8]={64, 128, 256, 384, 512, 640, 768, 896, 960}, but only pivots 0 and 8 need to be transmitted explicitly, the remaining, for i=1 to 7 (or N−1 in general) are implied as InputPivot[i]=($2^B$/N)*i=128*i.

Table 1 depicts an example syntax for supporting this method in VVC (Ref. [1], see Section 7.3.5.4, "Luma mapping with chroma scaling data syntax"). New syntax elements in the existing draft version are depicted with an italic font.

TABLE 1

Example syntax for PWL pivot adjustment according to method 1

| | Descriptor |
|---|---|
| lmcs_data ( ) { | |
|   lmcs_min_bin_idx | ue(v) |
|   lmcs_delta_max_bin_idx | ue(v) |
|   *lmcs_first_input_pivot* | *u(v)* |
|   *lmcs_last_input_pivot* | *u(v)* |
|   lmcs_delta_cw_prec_minus1 | ue(v) |
|   for ( i = lmcs_min_bin_idx; i <= LmcsMaxBinIdx; i++ ) { | |
|     lmcs_delta_abs_cw[ i ] | u(v) |
|     if ( lmcs_delta_abs_cw[ i ] ) > 0 ) | |
|       lmcs_delta_sign_cw_flag[ i ] | u(1) |
|   } | |
| } | | lmcs_first_input_pivot signals the first pivot value of valid codeword range. v=lumaBitDepth, for example, for lumaBitDepth=10, lmcs_first_input_pivot=64.

lmcs_last_input_pivot signals the last pivot value of valid codeword range. v=lumaBitDepth, for example, for lumaBitDepth=10, lmcs_last_input_pivot=960.

Switching from N=16 to N=8, given Table, 1, the corresponding text in Ref. [1] (with N=8) (see Section 7.4.6.4, "Luma mapping with chroma scaling semantics") will need to be modified as follows:

The variable OrgCW is derived as follows:
OrgCW = (1 << $BitDepth_Y$) / 8     (7-85-rev)
...

The variable InputPivot[i], with i=1 . . . 7, is derived as follows:

InputPivot[ i ] = i * OrgCW     (7-89-rev1)
*InputPivot[ 0 ] = lmcs_first_input_pivot*
*InputPivot[ 8 ] = lmcs_last_input_pivot*

Since now the first and last segments are not equal in length with the remaining segments, the slopes in those two segments for both the forward and inverse mapping will need to be computed based on the values of InputPivot[0] and InputPivot[N] (see equation (9)). This will require two divisions, thus adding some additional computing complexity compared with two shifts. For example, operations related to equation (7-90) in Ref. [1], The variable LmcsPivot[i] with i=0 . . . 16, the variables ScaleCoeff[i] and InvScaleCoeff[i] with i=0 . . . 15, are derived as follows:

```
LmcsPivot[ 0 ] = 0;
for( i = 0; i <= 15; i++ ) {
    LmcsPivot[ i + 1 ] = LmcsPivot[ i ] + lmcsCW[ i ]
        ScaleCoeff[ i ] = ( lmcsCW[ i ] * (1 << 11) + (1 << (Log2(OrgCW) − 1))) >>
(Log2(OrgCW))                                                          (7-90)
        if ( lmcsCW[ i ] == 0 )
            InvScaleCoeff[ i ] = 0
        else
            InvScaleCoeff[ i ] = OrgCW * (1 << 11) / lmcsCW[ i ]
}
``` may be replaced with:

The variable LmcsPivot[i] with i=0 . . . 8, the variables ScaleCoeff[ i] and InvScaleCoeff[ i] with i=0 . . . 7, are derived as follows:

```
LmcsPivot[ 0 ] = 0;
for( i = 0; i <= 7; i++ ) {
    LmcsPivot[ i + 1 ] = LmcsPivot[ i ] + lmcsCW[ i ]
    ScaleCoeff[ i ] = ( lmcsCW[ i ] * (1 << 11) + (InputPivot[ i+1 ] − InputPivot[ i ] ) >>
        1)
        / (InputPivot[ i+1 ] − InputPivot[ i ] )                       (7-90-rev)
        if ( lmcsCW[ i ] == 0 )
            InvScaleCoeff[ i ] = 0
        else
            InvScaleCoeff[ i ] = (InputPivot[i+1] − InputPivot[i] ) * (1 << 11) / lmcsCW[ i ]
}
```

Note that outside of i=0 and I=7, (InputPivot[i+1]−InputPivot[i])=OrgCW, so if the loop above is split into three parts: a) for i=0, (using division) b) for i=1 to 6 (using shifts), and c) for i=7 (using division), then only two new divisions are needed. If performing division is preferred, then (7-90-rev) can be re-written as ScaleCoeff[$i$]=(lmcsCW[$i$]*(1«11))/(InputPivot[$i$+1]−InputPivot[$i$])

It is noted that the method is not limited to 8 segments; it can be applied to any other type of segmentation, such as such as 4 or 2 segments, or a single segment.

From Ref [1], in section 8.5.6.6, "Weighted sample prediction process for combined merge and intra prediction," and section 8.7.5.2, "picture reconstruction with mapping process for luma samples", forward mapping is described as:

```
idxY = predSamplesInter[ x ][ y ] >> Log2( OrgCW )
predSamplesInter [ x ][ y ] = Clip1_Y( LmcsPivot[ idxY ] +         (8-818)
    ( ScaleCoeff[ idxY ] * ( predSamplesInter[ x ][ y ] − InputPivot[ idxY ] ) +
        ( 1 << 10 ) ) >> 11 )
```

Using the proposed method:

```
idxY = predSamplesInter[ i ][ j ] >> Log2( OrgCW )
if (idxY == 0 && inputSamples[x ][y ] < inputPivot[0])
    PredSamplesInter [ x ][ y ] = LmcsPivot[ 0 ] )
else if (idxY == 7&& inputSamples[x][y ] > inputPivot[8]) )
    PredSamplesInter [ x ][ y ] = LmcsPivot[ 8 ] )
else
idxY = predSamplesInter[ x ][ y ] >> Log2( OrgCW )
predSamplesInter [ x ][ y ] = Clip1_Y( LmcsPivot[ idxY ] +
    ( ScaleCoeff[ idxY ] * ( predSamplesInter[ x ][ y ] − InputPivot[ idxY ] ) +
        ( 1 << 10 ) ) >> 11 )                                   (8-818-rev1)
``` thus, additional comparisons are needed. Same comparisons can be done for (8-989) by replacing x and y with i and j.

Similarly, for the inverse mapping, the original inverse mapping described in Section 8.8.2.2, "Inverse mapping process for luma sample."

The value of invLumaSample is derived as follows:

If slice_lmcs_enabled_flag of the slice that contains the luma sample lumaSample is equal to 1, the following ordered steps apply:
1. The variable idxYInv is derived by invoking the identification of piece-wise function index process for a luma sample as specified in clause 8.8.2.3 with lumaSample as the input and idxYInv as the output.
2. The variable invSample is derived as follows:

```
invSample = InputPivot[ idxYInv ] + ( InvScaleCoeff[ idxYInv ] *     (8-996)
    (lumaSample − LmcsPivot[ idxYInv ] ) + ( 1 << 10 ) ) >> 11
```

3. The inverse mapped luma sample invLumaSample is derived as follows:

invLumaSample=Clip1$_Y$(invSample)          (8-997)

needs to be modified as follows:

```
if ((idxYInv == 7 && lumaSample[ x ][ y ] > LmcsPivot[8] )
    invSample [ x ][ y ] = InputPivot[ 8]
else
    invSample = InputPivot[ idxYInv ] + ( InvScaleCoeff[ idxYInv ] * (8-996-rev1)
        ( lumaSample − LmcsPivot[ idxYInv ] ) + ( 1 << 10 ) ) >> 11
```

In another embodiment, instead of adding comparison, the forward and inverse mapping steps can be implemented by adding some additional clipping operations. For example, in forward mapping:

$$\begin{aligned}
&\text{idxY} = \text{predSamplesInter}[\,i\,][\,j\,] >> \text{Log2}(\text{OrgCW}) \\
&\textit{predSamplesInter}[\,x\,][\,y\,] = \textit{Clip3}\,(\textit{InputPivot}[0],\,\textit{InputPivot}[8],\,\textit{predSamplesInter}[\,x\,][\,y\,]) \\
&\text{predSamplesInter}[\,x\,][\,y\,] = \text{Clip1}_Y(\,\text{LmcsPivot}[\,\text{idxY}\,]\, + \\
&\quad (\,\text{ScaleCoeff}[\,\text{idxY}\,]\, * \,(\,\text{predSamplesInter}[\,x\,][\,y\,] - \text{InputPivot}[\,\text{idxY}\,]\,) + \\
&\quad (\,1 << 10\,)\,) >> 11\,)
\end{aligned}$$

(8-818-rev2)

where $$\text{Clip3}(x, y, z) = \begin{cases} x; & z < x \\ y; & z > y \\ z; & \text{otherwise} \end{cases}.$$

Same clipping can be done for (8-989) by replacing x and y with i and j.

Applying the Clip3( ) function guarantees that the output of the subtraction (predSamplesInter[x][y]−InputPivot[idxY]) will always be positive and makes sure that a sample is located in the valid part for piece 0 and 7.

Similarly, the inverse mapping may be modified as:
2. The variable invSample is derived as follows:

$$\begin{aligned}
&\textit{lumaSample}[\,x\,][\,y\,] = \textit{Clip3}\,(\textit{LmcsPivot}[0],\,\textit{LmcsPivot}[8],\,\textit{lumaSample}[\,x\,][\,y\,]) \\
&\text{invSample} = \text{InputPivot}[\,\text{idxYInv}\,] + (\text{InvScaleCoeff}[\,\text{idxYInv}\,]\, * \\
&\quad (\,\text{lumaSample} - \text{LmcsPivot}[\,\text{idxYInv}\,]\,) + (\,1 << 10\,)\,) >> 11
\end{aligned}$$

(8-996-rev2)

Again, the inserted Clip3( ) function guarantees that (lumaSample−LmcsPivot[idxYInv]) will always yield a positive value and that a sample is located in the valid part for piece 0 and 7.

In another embodiment, to reduce the amount of data being sent to define the first and last pivot points, one may use a simple lookup table (say, Table lmcs_pivot_table[i][j], i=0 to k, j=0 or 1) to list a set of k+1 commonly used pivot values. For example, in practice, common start and end values for valid pixel values are given by:

Start: $16*2^{(Bitdepth-8)}$,
End: $235*2^{(Bitdepth-8)}$,

Thus, for Bitdepth=8 bits or more, the following values may be used.

TABLE 2

Example default lmcs_pivot_table for determining the first and last pivot values

| lmcs_pivot_idx | InputPivot[0] | InputPivot[8] |
| --- | --- | --- |
| 0 | User defined | User defined |
| 1 | 16 | 235 |

In this example, lmcs_pivot_idx=0 is reserved to allow a user to explicitly specify user-defined values. Note that a Table with more entries could be used as well; however, for bit depths larger than 8 bits, one can simply use lmcs_pivot_table[1][j] to derive InputPivot[0] and InputPivot[8] as:

InputPivot[0]=lmcs_pivot_table[1][0]*$2^{(Bitdepth-8)}$
InputPivot[8]=lmcs_pivot_table[1][1]*$2^{(Bitdepth-8)}$ Given such a Table, then the proposed syntax in Table 1 could be modified as:

TABLE 3

Example syntax for PWL pivot adjustment according to method 1
and using a look-up table for starting and ending pivot points

| | Descriptor |
|---|---|
| lmcs_data ( ) { | |
|     lmcs_min_bin_idx | ue(v) |
|     lmcs_delta_max_bin_idx | ue(v) |
|     lmcs_pivot_idx | u(l) |
| if (lmcs_pivot_idx == 0) { | |
|       lmcs_first_input_pivot | u(v) |
|       lmcs_last_input_pivot | u(v) |
| } | |
|     lmcs_delta_cw_prec_minus1 | ue(v) |
|     for ( i = lmcs_min_bin_idx; i <= LmcsMaxBinIdx; i++ ) { | |
|       lmcs_delta_abs_cw[ i ] | u(v) |
|       if ( lmcs_delta_abs_cw[ i ]) > 0 ) | |
|         lmcs_delta_sign_cw_flag[ i ] | u(1) |
|     } | |
| } | | lmcs_pivot_idx signals an index (i) to lmcs_pivot_table [i][j] indicating the first (j=0) and last input pivot values (j=1). If lmcs_pivot_idx=0, then explicit values for lmcs_first_input_pivot and lmcs_last_input_pivot are read. lmcs_pivot_idx values range from 0 to 1.

Given the syntax in Table 3, equation (7-89) may be modified as follows:
The variable InputPivot[i], with i=1 . . . 7, is derived as follows:

$$\text{InputPivot}[\,i\,] = i * \text{OrgCW} \qquad (7\text{-}89\text{-rev2})$$
$$\textit{if lmcs\_pivot\_idx} == 0 \, \{$$
$$\quad \textit{InputPivot}[\,0\,] = \textit{lmcs\_first\_input\_pivot}$$
$$\quad \textit{InputPivot}[\,8\,] = \textit{lmcs\_last\_input\_pivot}$$
$$\}$$
$$\textit{else} \, \{$$
$$\quad \textit{InputPivot}[\,0\,] = \textit{lmcs\_pivot\_table}[\textit{lmcs\_pivot\_idx}][0] * 2^{\wedge}(\textit{bitdepth}_Y - 8)$$
$$\quad \textit{InputPivot}[\,8\,] = \textit{lmcs\_pivot\_table}[\textit{lmcs\_pivot\_idx}][1] * 2^{\wedge}(\textit{bitdepth}_Y - 8)\}$$

Method 2—Sub-Divide the First and Last Segments

In an embodiment, given that the range of input codewords for a valid bitstream is in general known, instead of signaling explicitly the first and last pivots (as in Method 1), the encoder may signal to the decoder that the first and last segments are actually only of half length. This method requires less overhead bits. Table 4 depicts an example syntax for supporting this method in VVC (Ref [1]) under the assumption that N=8.

lmcs_first_split_flag signals if the 0-th piece needs to be equally split into two parts and handled separately. If lmcs_first_split_flag=1, the 0-th piece is split, otherwise, not.

lmcs_last_split_flag signals if the 7-th piece needs to be equally split into two parts and be handle separately. If lmcs_last_split_flag=1, the 7-th piece is split, otherwise, not.

Compared to method 1, this requires fewer bits to transmit, since pivot points are larger integers than the 0 or 1 flags; however, it is less flexible (cannot specify any value in $0^{th}$ piece and $7^{th}$ piece) and cannot be applied to other cases, such as when using 4, 2, or 1 pieces. Given the syntax in Table 4, for changing N=16 to N=8, in Section 7.4.6.4 of Ref. [1] requires the following edits:

The variable OrgCW is derived as follows:
$$\text{OrgCW} = (1 << \text{BitDepth}_Y) / 8 \qquad (7\text{-}85\text{-rev})$$
...

The variable InputPivot[i], with i=1 . . . 7, is derived as follows:

$$\text{InputPivot}[\,i\,] = i * \text{OrgCW} \qquad (7\text{-}89\text{-rev2})$$
$$\textit{InputPivot}[\,0\,] = \textit{lmcs\_first\_split\_flag} \,?\, \textit{OrgCW}>>1 : 0$$
$$\textit{InputPivot}[\,8\,] = \textit{lmcs\_last\_split\_flag} \,?$$
$$8 * \textit{OrgCW} - (\textit{OrgCW}>>1) : 8 * \textit{OrgCW}$$

TABLE 4

Example syntax for PWL pivot adjustment according to method 2

| | Descriptor |
|---|---|
| lmcs_data( ) { | |
|     lmcs_min_bin_idx | ue(v) |
|     lmcs_delta_max_bin_idx | ue(v) |
|     lmcs_first_split_flag | u(l) |
|     lmcs_last_split_flag | u(l) |
|     lmcs_delta_cw_prec_minus1 | ue(v) |
|     for ( i = lmcs_min_bin_idx; i <= LmcsMaxBinIdx; i++ ) { | |
|       lmcs_delta_abs_cw[ i ] | u(v) |
|       if ( lmcs_delta_abs_cw[ i ]) > 0 ) | |
|         lmcs_delta_sign_cw_flag[ i ] | u(1) |
|     } | |
| } | |

Thus, the values of InputPivot[0] and InputPivot[N] are now computed implicitly instead of being transmitted explicitly. From this point on, the derivation of the forward and inverse slopes is the same as discussed earlier (see edits related to equation (7-85-rev)).

Comparing N=16 vs N=8, for 10-bit data, for Luma (Y), simulation results using the VVC test sequences show that on the average Method 1 yields about 0.02% performance loss (All Intra) or −0.03% gain (Random Access) for SDR content and 0.1% loss (All Intra) or no change in Random Access for HDR.

These results indicate that one can reduce the number of pieces from 16 to 8 with minimal drop in coding performance. This results in fewer maximum possible comparisons at the decoder (to identify the correct bin or segment), but requires up to two new divisions, and some additional comparisons or clipping operations depending on whether pivot points for the start and end segments are transmitted explicitly (more accurately) or implicitly (less accurately, but with fewer bits).

Figure 4A:
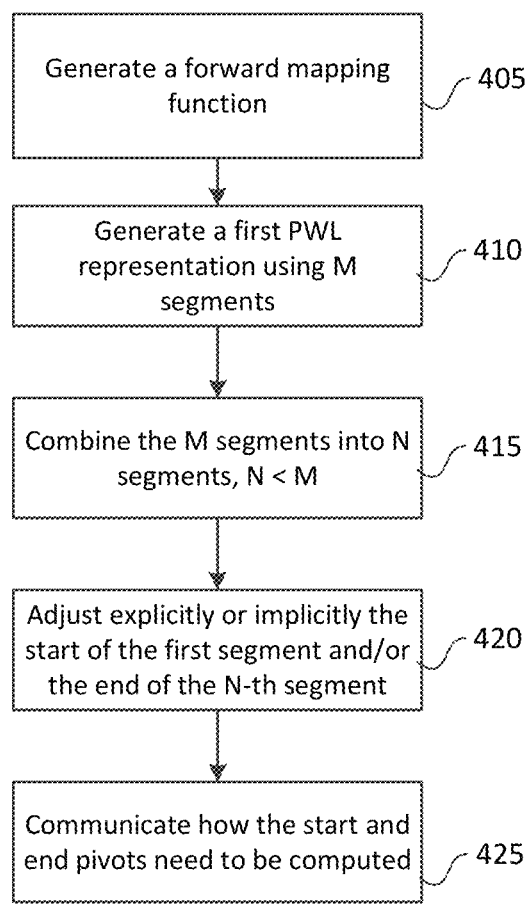
FIG. 4A depicts an example process for generating a piecewise linear representation for a forward reshaping (remapping) curve according to an embodiment.

FIG. 4A depicts an example process for generating a PWL representation of a reshaping function with reduced segments according to an embodiment. The process starts in step 405 by generating the original FwdMap function. Given this function, in step 410, a first PWL representation with M segments (e.g., M=32 or 64) may be generated. Next, in step 415, one may generate an N-segment PWL representation given those M segments. If part of the first and last segments in the N-PWL representation have zero codewords, in step 420, their length is adjusted, and the new length is communicated as part of the bitstream. Finally, in step 425, the bitstream syntax identifies if and how the first and last segments need to be adjusted. In Method 1, the start of the first segment and the end of the last segment are explicitly coded (see Tables 1 and 3). In Method 2, the bitstream syntax indicates simply that the first and/or the last segments are divided by half (see Table 4). Method 2 requires fewer bits, but it is less flexible.

Figure 4B:
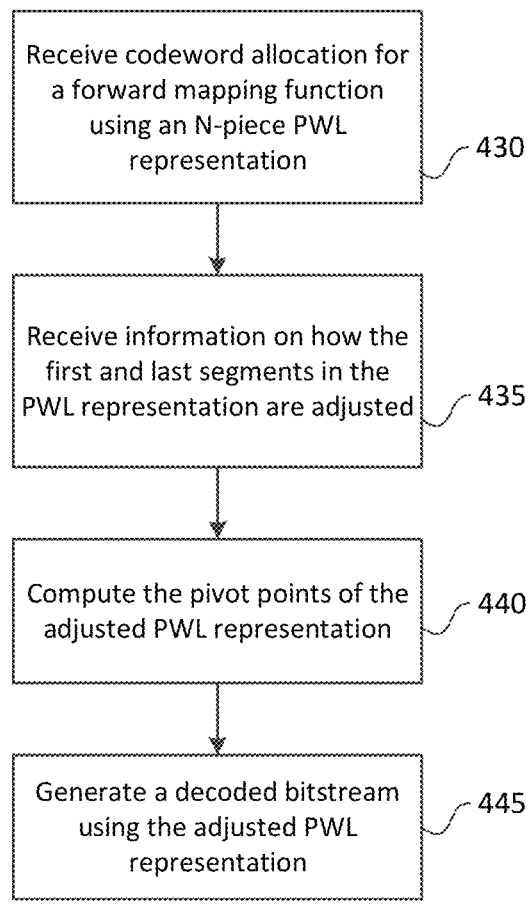
FIG. 4B depicts an example of receiving a PWL mapping according to FIG. 4A and generating a decoded bitstream according to an embodiment.

FIG. 4B depicts an example on how to apply an N-PWL representation of a reshaping function, as generated by the process in FIG. 4A, to generate a decoded bitstream according to an embodiment. A receiver assumes a N-PWL representation where all segments are equal. For each such segment, it also receives the number of assigned codewords (step 430). In step 435, the receiver may receive flags or explicit data to adjust the length of the first and last segments. Based on this information, in step 440, the receiver may adjust the starting pivot and the end pivot of the first and last segments and use these updated points in step 445 to a) compute the slope (and inverse slope) of the mapping function in the first and last segments and b) generate forward and inverse mappings for in-loop reshaping to generate the decoded bitstream. For N=8, and for VVC, examples of such adjustments are given in at least the revised equations (7-85-rev), (7-89-rev1), (7-89-rev2), (7-90-rev), (8-818-rev1), (8-818-rev2), (8-996-rev1), and (8-996-rev2).

References

Each one of the references listed herein is incorporated by reference in its entirety.

[1] B. Bross, J. Chen, and S. Liu, "*Versatile Video Coding* (Draft 5)," JVET output document, JVET-N1001, v5, uploaded, May 14, 2019.

[2] PCT Application PCT/US2019/017891, Image Reshaping in Video Coding Using Rate Distortion Optimization, filed on Feb. 13, 2019, by P. Yin et al.

[3] "*Algorithm description for Versatile Video Coding and Test Model* 4 (VTM 4)," J. Chen et al., JVET Output document, JVET-M1002-v2, 13th Meeting, Marrakech, 9-18 Jan. 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping and coding of images as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient signal reshaping and coding of images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims.

Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for in-loop reshaping of a video sequence with a processor, the method comprising:
generating a first piece-wise linear representation of a forward reshaping function using N segments all of an equal length, wherein the forward reshaping function maps luma pixel values of the video sequence from a first codeword representation to a second codeword representation, wherein the codeword start of the first segment is zero and the codeword end of the last segment is $2^{Bitdepth}-1$, where Bitdepth denotes the bit-depth of the luma pixels of the video sequence;
in the first piece-wise linear representation, adjusting the codeword start of the first segment to generate an adjusted first segment of less than the equal length and adjusting the codeword end of the last segment to generate an adjusted last segment of less than the equal length to generate an output piece-wise linear representation of the forward reshaping function using the adjusted first segment, the adjusted last segment and zero or more remaining unadjusted segments of the N segments;
generating syntax elements related to the output piece-wise linear representation of the forward reshaping function; and
generating a coded bitstream using the output piece-wise linear representation of the forward reshaping function, wherein the coded bitstream includes the syntax elements related to the output piece-wise linear representation of the forward reshaping function.

2. The method of claim 1, wherein N is 8 or smaller.

3. The method of claim 1, wherein for Bitdepth=10, the codeword start of the first segment is adjusted to be equal or larger to 64 and the codeword end of the last segment is adjusted to be smaller or equal than 960.

4. The method of claim 1, wherein the syntax elements related to the output piece-wise linear representation of the forward reshaping function comprise a first pivot parameter defining the codeword start of the first segment and a second pivot parameter defining the codeword end of the last segment.

5. The method of claim 4, wherein the syntax elements further comprise an index parameter to a look-up pivot table comprising values for the codeword start of the first segment and the codeword end of the last segment.

6. The method of claim 5, wherein a specific value of the index parameter indicates to a decoder that codeword start of the first segment and the codeword end of the last segment are explicitly defined using the first pivot parameter and the second pivot parameter.

7. The method of claim 1, wherein the syntax elements related to the output piece-wise linear representation of the forward reshaping function comprise a first flag denoting whether the first segment is divided by two and the codeword start of the first segment is adjusted to be in the middle of the first segment, and a second flag denoting whether the last segment is divided by two and the codeword end of the last segment is adjusted to be in the middle of the last segment.

8. The method of claim 7, wherein if the first flag is 1, the codeword start of the first segment is implied to be given by 2Bitdepth/2N, and if the second flag is 1, the codeword end of the last segment is implied to be given by (2Bitdepth−(2Bitdepth/2N)).

9. A method to decode a coded bitstream using reshaping in a decoder, the method comprising:
receiving syntax elements for a piece-wise linear representation of a forward reshaping function using N segments, wherein the forward reshaping function maps luma pixel values of the coded bitstream from a first codeword representation to a second codeword representation, wherein the syntax elements comprise one or more pivot parameters to adjust the codeword start of the first segment from 0 to a second codeword start greater than 0 and to adjust the codeword end of the last segment from $2^{Bitdepth}-1$, to a second codeword end different from $2^{Bitdepth}-1$, where Bitdepth denotes the bit-depth of the luma pixels of the coded bitstream;
determining the second codeword start of the first segment and the second codeword end of the last segment based on the one or more pivot parameters to generate an adjusted piece-wise linear representation of the forward reshaping function; and
decoding the coded bitstream based on the adjusted piece-wise linear representation of the forward reshaping function.

10. The method of claim 9, wherein the one or more pivot parameters comprise a first pivot parameter defining the second codeword start of the first segment and a second pivot parameter defining the second codeword end of the last segment.

11. The method of claim 10, wherein the one or more pivot parameters comprise an index parameter to a look-up pivot table comprising values for the second codeword start of the first segment and the second codeword end of the last segment.

12. The method of claim 11, wherein a specific value of the index parameter indicates to the decoder that the second codeword start of the first segment and the second codeword end of the last segment are explicitly defined using the first pivot parameter and the second pivot parameter.

13. The method of claim 9, wherein the one or more pivot parameters comprise a first flag denoting whether the first segment is divided by two and the second codeword start of the first segment is implied to be at the middle of the first segment, and a second flag denoting whether the last segment is divided by two and the second codeword end of the last segment is implied to be at middle of the last segment.

14. The method of claim 13, wherein if the first flag is 1, the second codeword start of the first segment is implied to be given by 2Bitdepth/2N, and if the second flag is 1, the second codeword end of the last segment is implied to be given by (2Bitdepth−(2Bitdepth/2N)).

15. An apparatus comprising a processor and configured to perform a method as recited in claim 1.

16. A non-transitory computer-readable storage medium having stored thereon computer-executable instruction for executing a method with one or more processors in accordance with claim 1.

* * * * *